United States Patent [19]

Hansen

[11] Patent Number: 5,732,502

[45] Date of Patent: Mar. 31, 1998

[54] FISHING LURE

[76] Inventor: Paul E. Hansen, 1979 125th La. NE., Blaine, Minn. 55449

[21] Appl. No.: 574,940

[22] Filed: Dec. 19, 1995

[51] Int. Cl.$^6$ .................................................. A01K 85/00
[52] U.S. Cl. .................................... 43/42.39; 43/42.53
[58] Field of Search .......................... 43/42, 42.39, 42.53, 43/42.47, 42.5

[56] References Cited

U.S. PATENT DOCUMENTS

| | | | |
|---|---|---|---|
| 1,321,850 | 11/1919 | Rhodes | 43/42.23 |
| 1,476,139 | 12/1923 | Bingham | 43/42.5 |
| 1,487,556 | 3/1924 | Goble | 43/42.47 |
| 1,701,444 | 2/1929 | Darr | 43/42.47 |
| 1,923,623 | 8/1933 | Hoage | 43/42.47 |
| 2,239,802 | 4/1941 | Westby | 43/42.47 |
| 2,535,211 | 12/1950 | Jelinek | 43/42.5 |
| 2,557,516 | 6/1951 | Schipper | 43/42.39 |
| 2,795,076 | 6/1957 | Luft | 43/42.39 |
| 3,401,483 | 9/1968 | Bellah et al. | 43/42.39 |
| 3,724,117 | 4/1973 | Flanagan, Jr. | 43/42.24 |
| 3,738,046 | 6/1973 | Johnson | 43/42.39 |
| 3,744,175 | 7/1973 | Bellah et al. | 43/42.39 |
| 3,922,811 | 12/1975 | Ellingson | 43/43.39 |
| 4,594,808 | 6/1986 | Brown | 43/42.5 |
| 4,845,883 | 7/1989 | Langer | 43/42 |
| 5,193,299 | 3/1993 | Correll | 43/42.47 |

FOREIGN PATENT DOCUMENTS

| | | | |
|---|---|---|---|
| 0312453 | 7/1969 | Sweden | 43/42.39 |

*Primary Examiner*—Joseph J. Hail, III
*Attorney, Agent, or Firm*—Janet Peyton Schafer

[57] ABSTRACT

A fishing lure made of resilient material with a relatively flat vertical body shape, having horizontal wings positioned perpendicular to the body, and weighted so as to glide or plane out in a forward horizontal motion in response to being pulled through water. This gliding motion is achieved from both the up and down motions of normal "jigging" motion by the user. At least one fishing hook may be attached for catching fish. Additional hooks or lures may also be attached. Continued "jigging" results in the lure reversing upon itself and following a path beneath user, the path roughly following a daisy-shaped path enabling the user to access fish in a wide-spread area below the user's position.

8 Claims, 7 Drawing Sheets

FISHING LURE

BACKGROUND

This invention relates to fishing lures, and in particular to fishing lures having horizontal movement in response to vertical jigging of the fishing line.

While various types of fishing lures having a particular motion have been known for many years, these lures have been used with trolling or surface fishing. It has been a problem for stationary fisherman, for example an ice fisherman, to accomplish fish attracting horizontal lure motion with available lures.

A further problem with the prior art has been the inability to cover more than a small area while ice fishing. Many ice lures enable the fisherperson to fish in only an area equal to the size of the ice hole, i.e., a hole 8 inches in diameter. This limits access to fish to those found within an 8 inch column extending below the ice hole. Also, a problem with prior art ice fishing lures has been that they do not mimic the motion of actual prey when the fishing line is jigged in a vertical direction.

SUMMARY

The present invention is directed to a fishing lure that satisfies these needs for an economic, fishing lure having motion in a horizontal plane including movement in a circle and including movement in other patterns such as a daisy-shaped pattern. The fishing lure of the present invention provides a fishing lure made of rigid, or semi-rigid material shaped and weighted so as to glide in the water when the lure is attached to a fishing line and the line is either horizontally extended or retrieved. The lure glides in response to rapid "jigging" of the line, a consequence of which is that the lure moves at an angle between 0° and 45°, from horizontal. Repetitive extension or retrieval of the line results in the lure moving about the base of a cone shape having a 45° angle between the apex and base of the cone.

A fishing lure having features of the present invention comprises a lure body having a pair of wings, extending at a 90° angle from the body and positioned to produce a distinct pattern of travel in response to jigging of a fishing line, at least one aperture for attachment of the fishing line to the lure, a weight for, in addition to countering the buoyancy of the lure, leveling and propelling the lure in the water and providing means for attaching a hook to the lure.

A fishing lure having multiple hook attachment means.

A fishing lure having means for attachment of additional lures thereto.

It is an object of the present invention to provide a fishing lure that travels in a pattern without being steered or guided by the user other than a conventional jigging motion. The basic pattern the lure travels resembles a daisy pattern with the lure traveling out away from a central starting position directly beneath the user. The lure travels up and down in a Y axis plane, the axis defined by the user at the apex and the lure at rest at the base, in response to the jigging motion by the user. Additionally, the lure travels in an area either side of the Y axis, on the X plane, that is, in a horizontal plane at right angle to the Y-axis. The lure travels in a straight vertical line, reaches the end of the horizontal run, or the maximum angle of the line-connected lure, then the lure turns back on itself and passes over the central start position on its path to the maximum angle on the opposite side of the Y axis, all the while additionally moving up and down slightly in response to the jigging action by the user. The path the lure travels can be described as a daisy pattern with the lure at rest immediately below the user as the central start position.

A fishing lure according to this invention can be formed in one piece from a single planar square of sheet material. The square is scored with four lines radiating from a first corner of the square. The first line forms a 15° angle with a first side extending from the first corner of the lure. The second line forms a 15° angle with the first line. The third line forms a 30° angle with the second line. The fourth line forms a 15° angle with the third line.

To shape the lure, the lure is bent at the second line forming a first flat fold to a first surface of the square. The square is bent at the first line to form a wing surface projecting at a right angle from the first surface. The square is bent on the third line forming a second flat fold to a second surface of the square. The square is bent at the fourth line to form a wing surface projecting at a right angle from the second surface.

BRIEF DESCRIPTION OF THE DRAWINGS

Understanding of the invention will be enhanced by referring to the accompanying drawing, in which like numbers refer to like parts in the several views and in which.

DETAILED DESCRIPTION OF THE PREFERRED EMBODIMENTS

Understanding of the invention will be further enhanced by referring to the following illustrative but nonlimiting example. As described herein, "jigging" refers to the rapid up and down motions by the user of the fishing line with a lure of this invention attached.

Figure 1A:
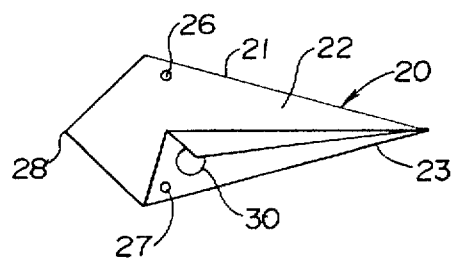
FIG. 1a is a left side view of a fishing lure of the present invention.
Figure 1B:
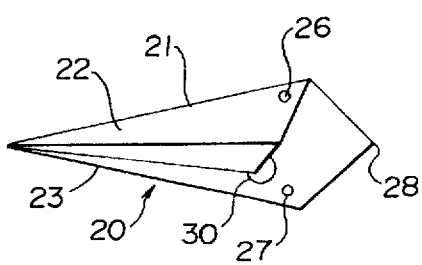
FIG. 1b is a right side view of a fishing lure of the present invention.
Figure 2:
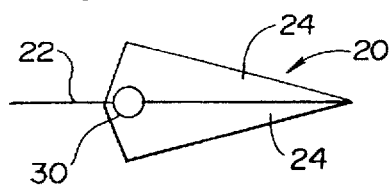
FIG. 2 is a bottom view of the fishing lure of the present invention, as seen in FIGS. 1a and 1b.

The presently preferred embodiments of the invention, as shown in the drawings, illustrate the practice thereof and are not by way of limitation of the scope of the invention. Like reference characters refer to corresponding elements throughout the several views. FIGS. 1a and 1b illustrate a fishing lure 20 having a body 22, a weight 30 positioned on body 22 and at least two apertures 26, 27. A pair of wings 24 project from body 22, shown at FIGS. 1a, 1b, 2, 3a & 3b. An aperture 26, formed in lure 20, receives a split ring 32, FIGS. 3a & 3b, by which the fishing line 40, shown in FIGS. 8–11, may be attached. An additional aperture 27, provides means for attaching a fishing hook 56, shown in FIGS. 3a & 3b.

In a preferred embodiment, body 22 is formed of aluminum or other metal, although hard plastics, such as injected plastic could be utilized. Additionally, a soft-bodied lure, may also be utilized, so long as it may support a pair of wings 24 in a generally horizontal position relative to the body's 22 generally vertical position. The second embodiment 20' illustrates a plastic or soft body design having a one-piece body construction of equal or greater density than water. So long as the lure body 22 is made relatively thin and has the generally vertical and horizontal planes formed in the body of the lure 20, it can accomplish all motions described herein.

Figure 5:
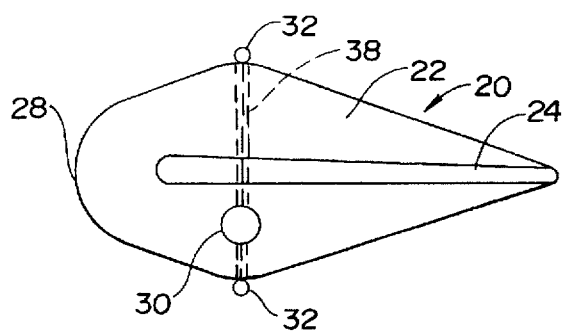
FIG. 5 is a left side view of a second embodiment of a fishing lure of the present invention, the right side view being a mirror image of this view.
Figure 6:
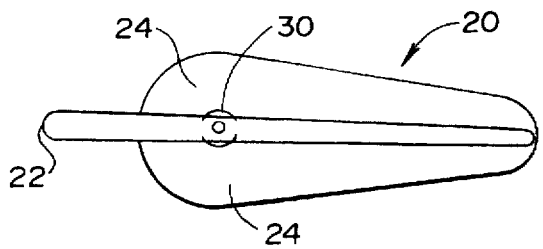
FIG. 6 is a top view of the second embodiment, the bottom view being a mirror image of this view.
Figure 7:
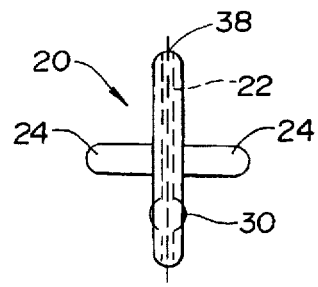
FIG. 7 is front view of the second embodiment, the back view being a mirror image of this view.

In the second embodiment, 20' shown at FIGS. 5–7, hook and line connections are attached together through the soft-bodied lure body 22 by means of an aperture 38, shown in phantom at FIGS. 5,7, for receiving a metal support, not shown. The metal support may in turn be attached to fishing line 40 at one end and to hooks 56, at the other end of the metal support.

Figure 3A:
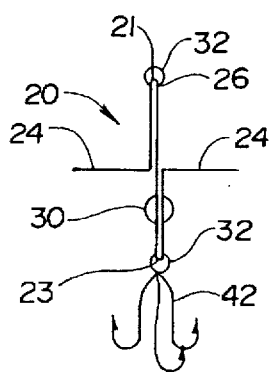
FIG. 3a is a back end view of a fishing lure of the present invention.
Figure 3B:
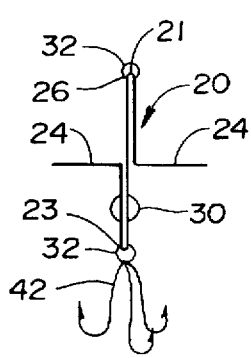
FIG. 3b is a front end view of a fishing lure of the present invention.
Figure 4:
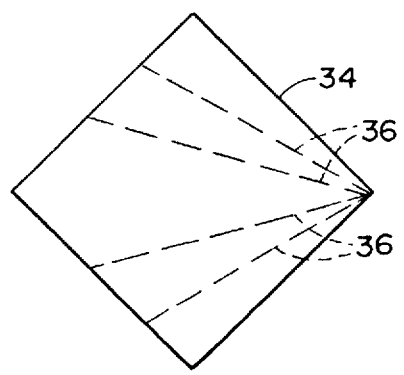
FIG. 4 is a view of the sheet of metal with fold lines indicated for forming a fishing lure of FIGS. 1–3.

In both embodiments of lure 20, 20', body 22 is shaped as a relatively thin vertical plane having flat sides and sharp upper edge 21 and lower edge 23 to reduce resistance when lure 20, 20' is pulled through water. In the first embodiment, a square 34 of thin pliable metal, is folded to form a generally elongated diamond shape, namely a kite shape, FIG. 4, although other shapes are envisioned. In actual use conditions, aluminum sheet metal has been used and is preferred, although other thin, pliable, and resilient materials could be used. This embodiment is of one piece construction with the wings 24 formed by folding the metal square into the configuration as shown at FIGS. 3a and 3b.

A pair of wings 24 extend at a generally 90° angle from body 22. This pair of wings 24 are, in both embodiments, formed so that wings 24 are positioned in a generally mid-line position on lure body 22 and wings are set back from nose 28 end of lure 20. Wings 24 taper from their widest point, a generally mid-line position on lure body 22, set back from nose 28 end to their narrowest point, at proximal end 29.

Because of the position at which weight 30 is attached to body 22, nose 28 rides in water in a position just below horizontal. The resistance of wings 24 when lure 20 is pulled through the water by the jigging motion provides the means for gliding of the lure 20, 20' in both embodiments. This planing or gliding motion occurs with both the up motion and down motion created by jigging the lure 20, 20' by the user, FIG. 8.

As stated earlier, other metals and hard and soft plastics may be used in the construction of the lure so long as the body is resilient enough to support the wings and maintain the position of nose 28 below the horizontal plane of the lure, and the wings 24 are resilient enough to resist deformation when lure 20 is pulled through water.

Weight 30, a conventional sinker or other weight, is attached to body 22, by being press-fit onto lure body 22, so that lure 20 will sink and does not float on top of the water when in use. An aperture, not shown, is drilled in body 22 to facilitate press-fitting of weight 30 onto lure 20. Weight 30 is positioned near lower edge 23 so lower edge 23 remains lower than upper edge 21 when lure 20 is in motion, with the exception of when lure 20 has traveled to its maximum path away from the central start position, FIGS. 10B & 11. This maximum path is determined by length of fishing line 40 between user and lure, illustrated at FIGS. 9B, 10B, & 11. When lure 20 reaches its maximum path away from the central start position 52, lure 20 turns back on itself and the lower edge 23 is momentarily above upper edge 21, FIGS. 10B & 11, until the effect of gravity pulls the weighted lower edge 23 back below upper edge 21, as indicated by arrow in FIG. 11.

Multiple apertures, in the example 26, 27, may be bored into the body 22 of lure 20 to provide means for either direct attachment of fishing line 40 and/or hooks, as seen in FIG. 3, to releasably attach lure 20 to a fishing line 40 and to attach at least one hook, as seen in FIGS. 3a and 3b, to lure 20. Multiple weights 30 can be added to compensate for ballast added to the lure, ballast in the form of additional lures or hooks. So long as nose 28 remains slightly lower than horizontal, wings 24 will provide glide to lure 20 when moved through water imparting the novel motion of this lure 20.

Figure 9:
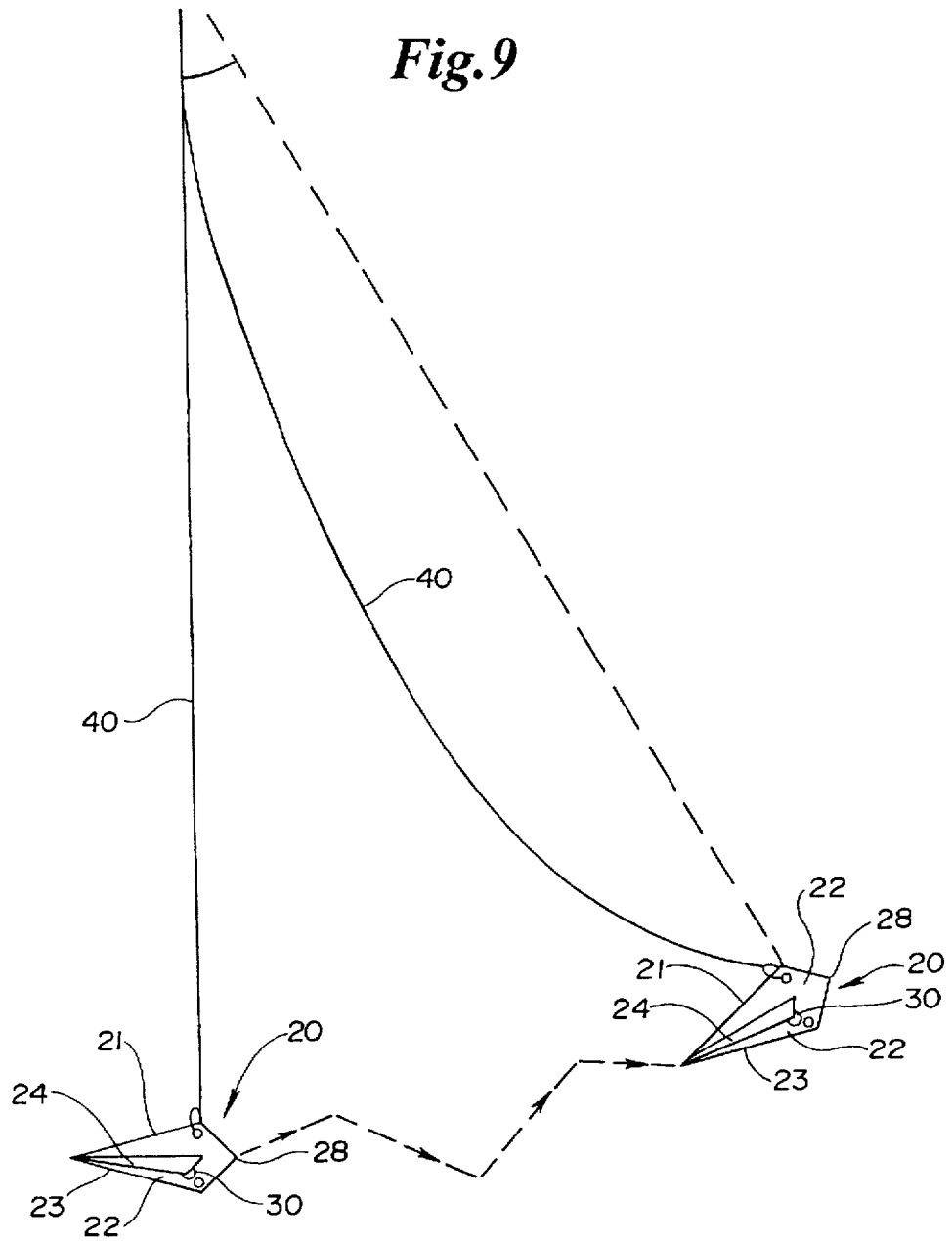
FIG. 9; is a side view of the fishing lure of FIGS. 1–4 illustrating the lure path, indicated in dotted line, in response to normal jigging motion of the fishing line, the lure traveling to location B its maximum path away from the central start position, location A.
Figure 12:
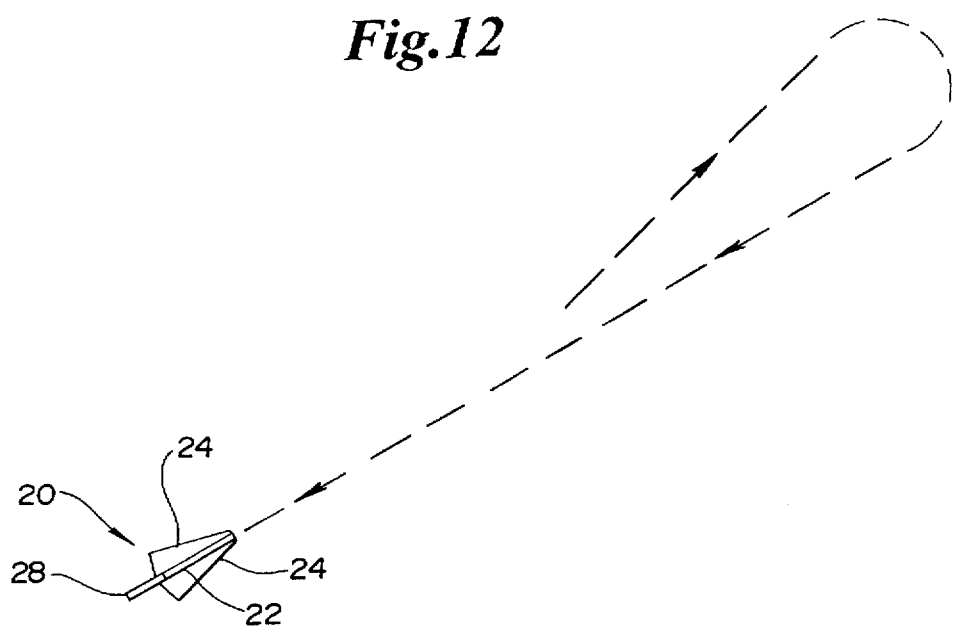
FIG. 12 is a top view of the fishing lure of FIGS. 1–4 at the beginning of its lure path crossing pattern, shown in dotted line.

The following description applies to either embodiment of lure 20 & 20'. For convenience, the lure is referred to as lure 20, but the description is intended, for this purpose, to refer similarly to lure 20'. Lure 20, having a pair of wings 24 and weight 30 attached, is provided for attachment to a fishing line 40 by means of split ring 32, as shown in FIG. 9. The user plays out a desired amount of fishing line 40, the lure 20, because it is weighted, rests directly below user at a central start position 52 as shown FIG. 13. The user then jigs fishing line 40 in an up-and-down motion. This up-and-down style of fishing is a favorite of ice, open water bobber and jig fisher persons. In either the up motion or the down motion, created by jigging the line, lure 20 will travel in a lure path 42, generally in a horizontal plane, indicated by broken line in FIGS. 12 & 13. The generally horizontal motion of lure 20 is achieved by the force of the water against the horizontal plane wings 24 of lure body 22 when lure 20 is pulled through the water in response to jigging by the user.

Figure 13:
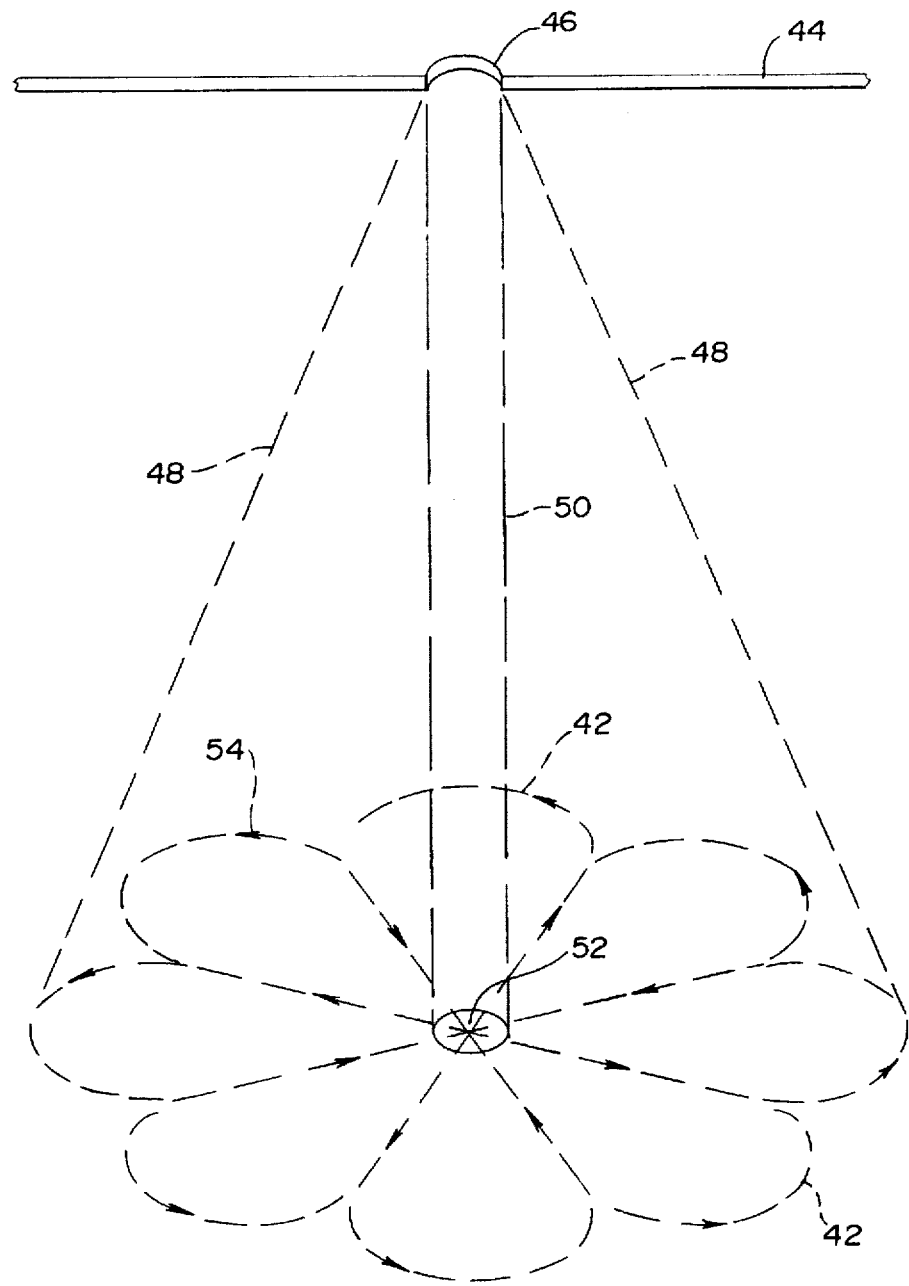
FIG. 13 is a plan view of the path of the fishing lure of FIGS. 1–4 within the cone shape relative to its central start position.

Because of the novel structure of lure 20, in addition to the generally horizontal motion, lure 20 also moves in a lure path 42 within a cone-shaped area 48, indicated by broken-dotted line in FIG. 13, the particular dimensions of the cone-shaped area 48, indicated by dotted and broken line, determined by the amount of fishing line 40 played out by user, and the depth of the water immediately below user. Generally, the length of the fishing line 40 is chosen so that lure 20 hangs free of the bottom or of obstructions in the water.

Jigging lure 20 upwardly FIG. 8A, raises lure 20. Because the fishing line 40 connection is positioned above lure body 22, nose 28, in response to jigging motion, angles upwardly and lure 20 is propelled generally horizontally forward by resistance of wings 24 to the water through which lure 20 is being pulled upwardly. The downward jigging motion lowers nose 28 and again propels lure 20 horizontally forward, FIG. 8B. While the generally horizontal plane wings 24 enables lure 20 to glide generally forward, the vertical plane, formed by lure body 22, prevents lure 20 from changing direction and prevents lure 20 from being dragged horizontally against the water. Because wings 24 are positioned set back from nose 28 and because weight 30 is positioned near lower edge 23 of lure 20, this forward movement of lure 20 is maintained and the generally vertical plane of lure body 22 prevents lure 20 from changing direction. In prior art lures, this water resistance caused prior lures to turn from their original course. Lure body 22, because it has a portion of body 22 both above and below the generally horizontal plane defined by wings 24, prevents lure 20 from turning on its Y axis.

Figure 10A:
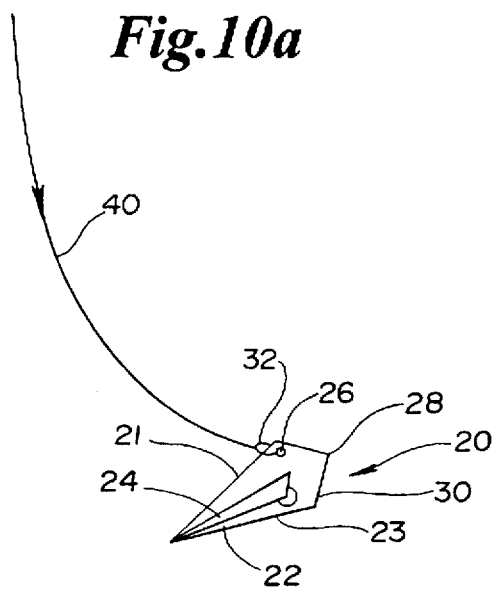
FIG. 10 is a side view of the fishing lure of FIGS. 1–4 on its lure path shown at its maximum path at A away from the central start position, at B shown falling back on itself after reaching this maximum path.
Figure 10B:
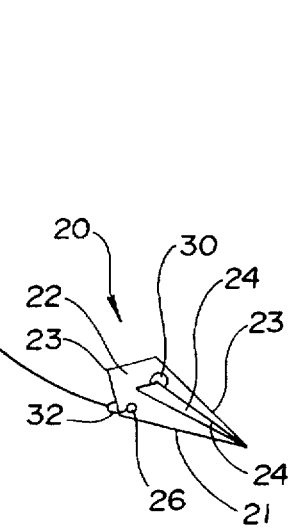
Figure 11:
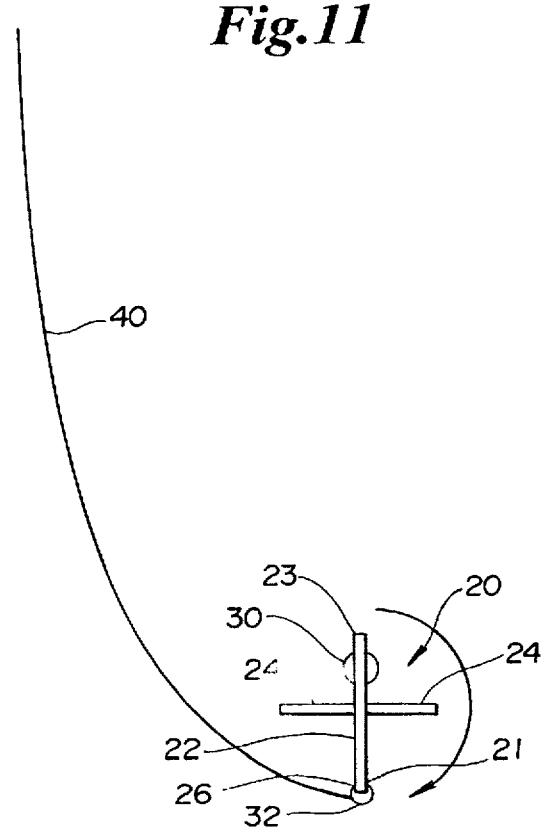
FIG. 11 is a close up end view of the fishing lure of FIG. 10, the lure falling back on itself at its maximum path away from the central start position.

When lure 20 reaches its maximum path, FIG. 10A, away from central start position 52, lure 20 reverses its direction. The maximum path away from central start position 52 is determined by the length of fishing line 40 played out, illustrated by cone shape 48. At this maximum path point, the weight of line 40, combined with the force of the water against line 40, will not be overcome by the horizontal drive of lure 20. Lure 20 is designed to automatically invert or fall back on itself FIG. 10B. FIG. 11 is a close-up view of lure 20 in this inverted position. When lure 20 becomes inverted, gravity acts on the weight 30 of lure 20 to pivot lure 20 so the lower edge 23 is again lower than the upper edge 21. The direction of lure 20 is automatically reversed, FIG. 12, and the pattern will repeat. This pattern occurs automatically in response to user's jigging motion alone. FIG. 13 illustrates a series of the above-described motions, resulting in a daisy-like pattern 54 in the area being covered by lure 20 in response to user's jigging motion.

In describing the unique motion of lure 20, it is helpful to remember that an object hanging straight down is at a 0° angle to the vertical or Y-axis. Movement to a horizontal plane would be at a 90° angle to the Y-axis. The movement of the fishing lure 20 of this invention, when the line is jigged, is movement at an angle between 0° and 45° from vertical. The present invention represents a decided improvement over previously known lures which achieve movement at an angle between 0° and 5° from vertical.

Motion of lure 20 can be described as movement in a conical space 48 in which the angle of the side of the cone is 45° from apex to base of cone. When fishing line 40 is steadily retrieved and extended, lure 20 fans out to travel around the vertical or Y axis, as around the base of the above described cone.

Figure 8:
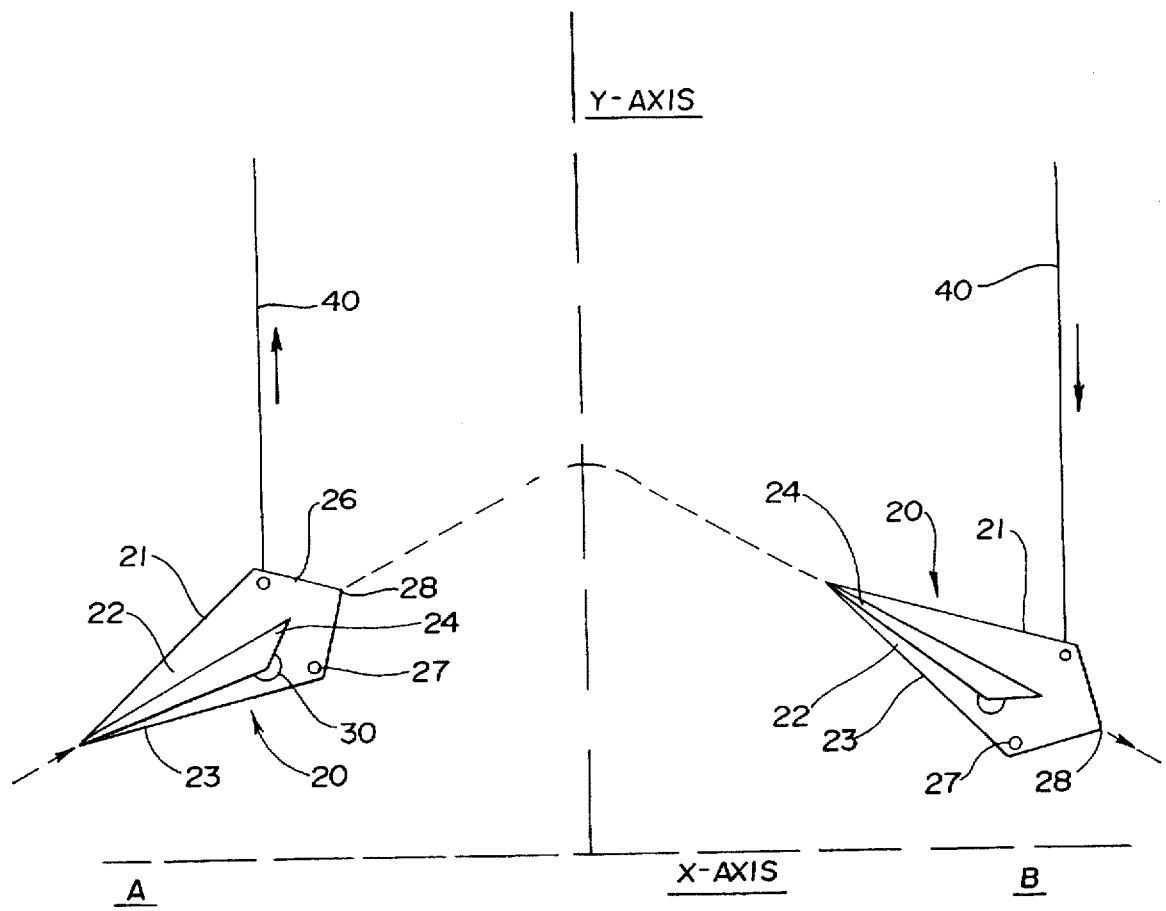
FIG. 8 is a side view of the fishing lure of FIGS. 1–4 illustrating lure movement, indicated in dotted line, in response to normal "jigging" motion of the fishing line.

The gliding motion of lure 20 is illustrated at FIG. 8. In response to an upward jigging motion by user, lure 20 initially moves generally upward until the water resistance against wings 24 being pulled through water causes lure 20 to glide generally forward FIG. 8A. In response to a downward jigging motion by user, lure 20 initially moves generally downwardly until again the water resistance against wings 24 being pulled though water causes lure 20 to plane out or, glide generally forward, FIG. 8B.

Lure 20, 20', while it may be used in all types of lure fishing, represents a decided improvement over prior art ice fishing lures in that prior art ice fishing lures enabled the user to access fish only a column of area in water equal in diameter to the ice hole 46 the user formed in the surface ice 44. A typical ice fishing area 50 is illustrated at FIG. 13.

Although the present invention has been described on considerable detail with reference to certain preferred versions thereof, other versions are possible. For example, bending wings 24 to a position other than perpendicular to lure body 22 would change the glide pattern of lure 20. Additionally, lure body shape could be changed, i.e. square-shaped or rectangular-shaped and this would alter to path of lure 20 in response to simple up-and-down jigging motion by a user. Therefore, the spirit and scope of the appended claims should not be limited to the description of the preferred versions contained herein.

What is claimed is:

1. A fishing lure formed in one piece from a single planar square of sheet material, the square scored with four lines radiating from a first corner, such that the first line forms a 15° angle with a first side extending from said first corner, the second line forms a 15° angle with the first line, the third line forms a 30° angle with the second line, and the fourth line forms a 15° angle with the third line;

such that the square is bent at the second line forming a first flat fold to a first surface of the square, and is bent at the first line to form a wing surface projecting at a right angle from the first surface; and such that the square is bent on the third line, forming a second flat fold to a second surface of the square, and is bent at the fourth line to form a wing surface projecting at a right angle from the second surface.

2. A fishing lure according to claim 1, and further including adhesive means for bonding said flat folds.

3. A fishing lure according to claim 1, and further including apertures through the flat folds, at corners extending from the first corner; a first aperture for attachment to a fishing line and a second aperture for attachment to a fish hook.

4. A fishing lure according to claim 3, and further including a weight positioned between the second aperture and a wing surface on a flat fold.

5. The fishing lure of claim 4, wherein said first aperture, formed in said lure adjacent a top edge of said lure for attachment of the fishing line, provides means for jigging said lure upwardly and downwardly in response to fishing line movement by a user.

6. The fishing lure of claim 5, wherein said wing surfaces, said weight and said top edge attachment of the fishing line work together to provide displacement of water when said lure is raised in water, said displacement propelling said lure horizontally forward and lure nose end upwardly as the fishing line is raised.

7. The fishing lure of claim 5, wherein said wing surfaces, said weight and said top edge attachment of the fishing line work together to provide displacement of water when said lure is lowered in response to downward jigging of the fishing line, said displacement propelling said lure horizontally forward and said lure nose end downwardly as the fishing line is lowered.

8. The fishing lure of claim 7, wherein said wing surfaces, said weight and said top edge attachment of the fishing line work together to provide means for reversing said lure upon itself in response to said lure gliding toward a maximum position away from a central start position, said lure nose end tipping upwardly until said lure is pulled over backward, in response to upward jigging by user positioned rearward of lure, whereupon gravity acts on said lure weight to rotate said lure in an X-axis, positioning said lure with said top edge upper most resulting in reversing direction of gliding direction of said lure such that said lure is positioned and propelled horizontally forward toward the central start position, said lure continuing horizontally forward past the central start position to a maximum point away from the central start position in the new direction, the pattern repeating so long as jigging motion continues.

\* \* \* \* \*